US008211371B2

(12) United States Patent
Stanke et al.

(10) Patent No.: US 8,211,371 B2
(45) Date of Patent: Jul. 3, 2012

(54) DEVICE AND PROCESS FOR HEAT TRANSFER

(75) Inventors: Klaus Stanke, Baienfurt (DE); Mathias von Lewinski, Weingarten (DE); Paul Kröhl, Ravensburg (DE)

(73) Assignee: Andritz Technology and Asset Management GmbH, Graz (AT)

( * ) Notice: Subject to any disclaimer, the term of this patent is extended or adjusted under 35 U.S.C. 154(b) by 315 days.

(21) Appl. No.: 12/460,603

(22) Filed: Jul. 22, 2009

(65) Prior Publication Data

US 2010/0059204 A1 Mar. 11, 2010

(30) Foreign Application Priority Data

Jul. 23, 2008 (AT) .................... A 1141/2008

(51) Int. Cl.
*F27B 15/14* (2006.01)
*F28D 7/08* (2006.01)
(52) U.S. Cl. .............. 422/146; 165/87; 165/88; 165/92; 165/94; 165/104.16; 165/157; 366/279; 366/290; 366/291; 366/292; 366/293
(58) Field of Classification Search ............. 422/146; 165/87, 92, 94, 88, 104.16, 157; 366/279, 366/290, 291, 292, 293
See application file for complete search history.

(56) References Cited

U.S. PATENT DOCUMENTS

| 464,166 | A | * | 12/1891 | Venuleth | 159/11.1 |
|---|---|---|---|---|---|
| 3,020,025 | A | * | 2/1962 | O'Mara | 165/87 |
| 3,250,321 | A | * | 5/1966 | Root | 165/94 |
| 3,500,901 | A | * | 3/1970 | Root et al. | 165/86 |
| 3,613,777 | A | * | 10/1971 | Nara | 165/86 |
| 3,835,921 | A | * | 9/1974 | Faris et al. | 165/86 |
| 4,621,684 | A | * | 11/1986 | Delahunty | 165/92 |
| 5,109,918 | A | * | 5/1992 | Huschka et al. | 165/104.18 |
| 2006/0254756 | A1 | * | 11/2006 | Kaser et al. | 165/133 |
| 2006/0257293 | A1 | * | 11/2006 | Nguyen et al. | 422/131 |

FOREIGN PATENT DOCUMENTS

DE 25 11 944 9/1975
WO WO 97/07073 2/1997

* cited by examiner

*Primary Examiner* — Walter D Griffin
*Assistant Examiner* — Huy-Tram Nguyen
(74) *Attorney, Agent, or Firm* — Alix, Yale & Ristas, LLP

(57) ABSTRACT

A device for heat transfer, particularly in fluidized bed equipment. Several layers of heat exchanger tubes are provided, with radial arms mounted in between to mix and loosen the product. In addition, a process is disclosed for heat transfer in high-temperature processes for bulk material, particularly granulates or powders, in fluidized bed units, where the heat is transferred to and absorbed by the fluidized bed on several levels, and by the fluidized bulk material being agitated mechanically between these levels. This allows transfer of high energy densities without the risk of bridging or local overheating.

6 Claims, 5 Drawing Sheets

DEVICE AND PROCESS FOR HEAT TRANSFER

BACKGROUND

The invention relates to a device for heat transfer, particularly in fluidized bed equipment, as well as a process for heat transfer in high-temperature processes for bulk material, particularly granulates or powders, in fluidized bed equipment.

In many high-temperature processes, heat must be supplied or discharged in order to control the reaction. This includes calcination of limestone to obtain quick lime and dehydration of gypsum to obtain plaster of Paris or anhydrite plaster, as examples of endothermic reactions, and roasting of such ores as molybdenite $MoS_2$ and pyrite $FeS_2$ to obtain their oxides, as examples of exothermic reactions.

The kinetics of the reaction require a controlled temperature progression in order to prevent incomplete or too fast reactions. Particularly in continuous exothermic reactions, there may be undesirable incipient fusion, sintering and by-products, or the equipment may even be destroyed.

The state of the art includes various approaches towards solving this complex problem.

In DE 25 11 944, a cylindrical fluidized bed reaction is proposed for combustion of coal granulate. The heat is discharged through heat exchanger ducts with air flowing through, arranged horizontally on top of one another. The ducts are curved into an involute shape, and connect the centrally located air feed duct to the concentric collector on the outer wall. By unwinding the involute in a circle, high and even packing is obtained, as well as low-stress deformation due to heat expansion. Due to the high packing density, this process cannot be used for fine-grain powders because bridging and clogging occurs between the heat-exchanger tubes. WO 97/07073 suggests using cylindrical vessels for endothermic dehydration of gypsum, with a concentric tube coil in the vessel wall that is heated that is heated by means of flue gases. A helical ribbon mixer to loosen up the gypsum is provided in the remaining space available in the inner chamber. This improves heat transfer, and improved economic efficiency compared to conventional processes should be achieved if the vessels are placed in a multi-stage arrangement. Nevertheless, the heat exchanger surface to be placed at the edge of the vessel is small and the improvement that can be achieved is marginal.

A conventional multi-stage hearth furnace [Ullmann] is still used to roast $MoS_2$, where its single rack generates a temperature profile that can only be controlled rather inadequately by means of the combustion air and water injection. In order to improve the exchange between gas and solids and to convey the powder, a central agitator with arms is provided on each rack. Nevertheless, sintering and incomplete oxidation still occur.

SUMMARY

The aim of the invention is to create a process and a device for bulk material, particularly granulates or powders, that guarantees good controllability of heat transition and prevent possible caking in the reaction vessel.

The invention is thus characterised by a plurality of layers of heat exchanger tubes being provided, with radial arms mounted in between to mix and loosen the product, where the heat exchanger tubes preferably extend largely over the entire material flow cross-section of the reaction vessel.

Advantageously, the radial arms are designed as rotating agitator arms. In this way, fluidisation of the bulk material is facilitated effectively and even heat treatment is thus achieved. This results in high packing density, without bridging or clogging between the tubes.

A further development of the invention is characterised by the heat exchanger tubes having a rotating design, where the rotary axle can be split into preferably two chambers into which the heat exchanger tubes open. Since the heat exchanger tubes rotate, there is some movement in relation to possible stationary arms that then act as flow breakers. This prevents blocking and caking of the product in the heat exchanger.

A favorable embodiment of this variant is characterised by rotation transmitters being provided at the end of the rotary axle to lead the heat-transfer medium in and out.

If several units are combined in a cascade arrangement, it is then possible to draw off intermediate products and also to set different reaction conditions, e.g. to produce specific product properties.

The invention is also directed to a method of heat transfer in high-temperature processes for bulk material, particularly granulates or powders, that is characterised by the heat being transferred to and absorbed by the fluidized bed on several levels, and by the fluidized bulk material being activated mechanically between these levels. In this way, it is possible to use different heat-transfer media, for example with different temperatures.

A favorable further development of the invention is characterised by heat transfer taking place largely over the entire cross-section of the fluidized bed. This results in a high energy density, which makes it possible to use compact units.

A further embodiment of the invention is characterised by the heat-transfer medium being a gas. In this way, the process can be controlled easily over a very large temperature range.

A favorable further development of the invention is characterised by the process including several stages. As a result, specific intermediate products of the reaction can be produced and drawn off from the process for further use.

The process according to the invention combines the advantages of the processes mentioned above without also bearing their disadvantages: (1) high volume-specific heat exchanger surface permits high heat transfer performance density and operating efficiency; (2) an agitator or rotating heat-exchanger pipes prevent bridging and enable application for fine-grain powders; (3) fluidisation provides a homogenous reaction product and prevents local overheating/undercooling; and (4) use of gas as heat-transfer medium allows the temperature to be controlled over a very wide range.

BRIEF DESCRIPTION OF THE DRAWING

The invention will now be disclosed in more detail by examples, with reference to the drawing, where.

DETAILED DESCRIPTION

Figure 1:
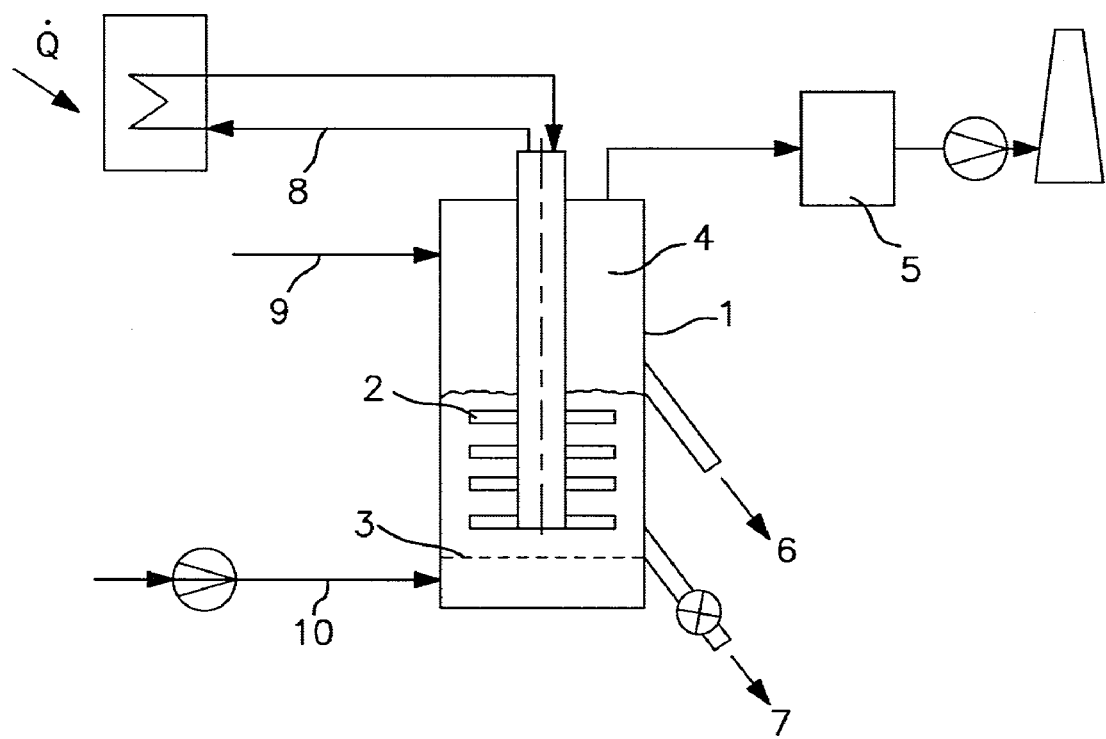
FIG. 1 shows a diagram representing the inventive process.

FIG. 1 represents the process context of the invention. This process largely comprises a longitudinally extending fluidized bed unit with vessel 1, heat exchanger tubes 2 running through it horizontally (radially relative to the axis) in several spaced apart layers. Gas 8 (air, flue gas, superheated steam, etc.) flows through the tubes in order to transfer heat to or absorb heat from bulk material fed in through and fluidising round the pipes 2. Gas is particularly suitable as heat-transfer medium because it is not subject to temperature or pressure restrictions like thermal oil or saturated steam/condensate.

Furthermore, a distribution device is provided for the fluidising gas 10, e.g. in the form of a distributor plate 3, as well as a free space 4 above it, where particles carried along can still separate from the gas flow before it enters the dedusting/cleaning plant 5.

The fluidized state causes an intensive exchange of heat and material, with the result that the product does not become inhomogenous. If the temperature of the heat-transfer medium is controlled accordingly, the temperature in the unit can be controlled very accurately so that there is no undercooling, overheating or uncontrolled reaction.

The bulk material is fed to the unit 1 through the inlet pipe 9 and reacts in accordance with the reaction conditions to become the final product, largely according to the principles of a so-called continuously operated stirred-tank reactor because of the good blending effect. By arranging several units 1 in series to form a cascade, the final state can also be achieved in several stages. As a result, intermediate products can be drawn off or different reaction conditions set in order to obtain specific product properties.

The final product leaves the unit 1 through a discharge or outlet gate 7 in the base or through an overflow outlet 6, preferably above the heat exchanger area.

During thermal treatment of, for example, very fine-grained, strongly heterogeneous and very light bulk materials, inhomogenous fluidising can occur at the heat exchanger, culminating in coating and blocking between the heat exchanger tubes. This problem can be solved with the process devices according to the invention.

Figure 2:
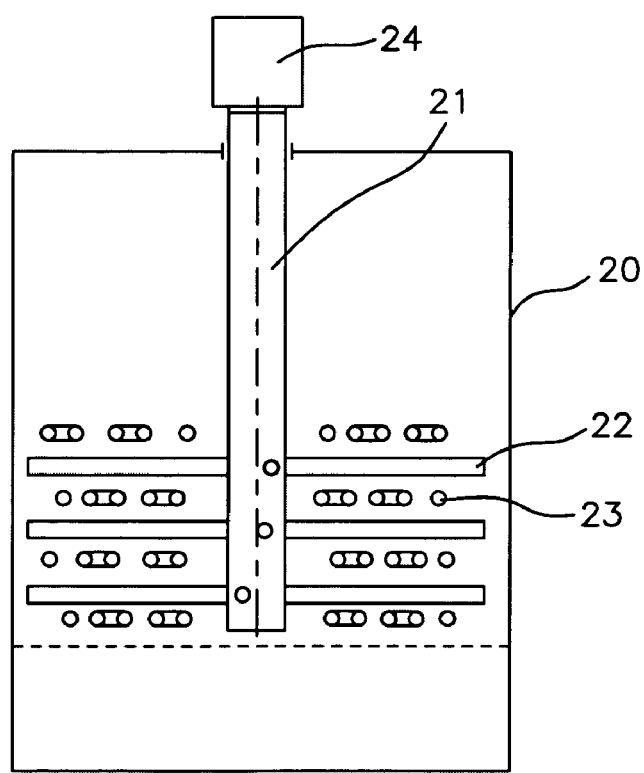
FIG. 2 shows a sectional view of one device according to the invention.
Figure 3:
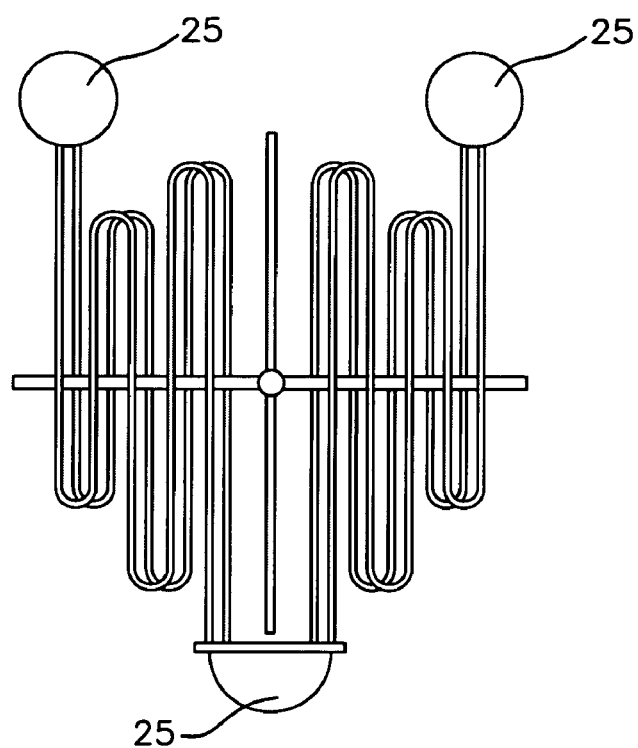
FIG. 3 contains a top view of a heat exchanger tube according to the invention.

In the first embodiment of a device according to the invention (FIG. 2) the heat exchanger 23 has a rigid mounting. In the centre it has a vertical axle 21 on which the radial agitating arms 22 are mounted and which extend to the edge of the vessel 20. The arms are arranged on several levels, between two layers of tubes in the heat exchanger 23 in each case, such that the entire heat exchanger area is covered. There are preferably several arms 22 on each level. The axle 21 has a drive 24, and fluidisation of the bulk material is assisted mechanically by the movement transferred to the arms 22 so that no caking or blocking can occur. The heat-transfer gas 8 is led in and out via collectors 25 outside on the wall of the vessel 20 into which the individual heat exchanger tubes open (FIG. 3).

Figure 4:
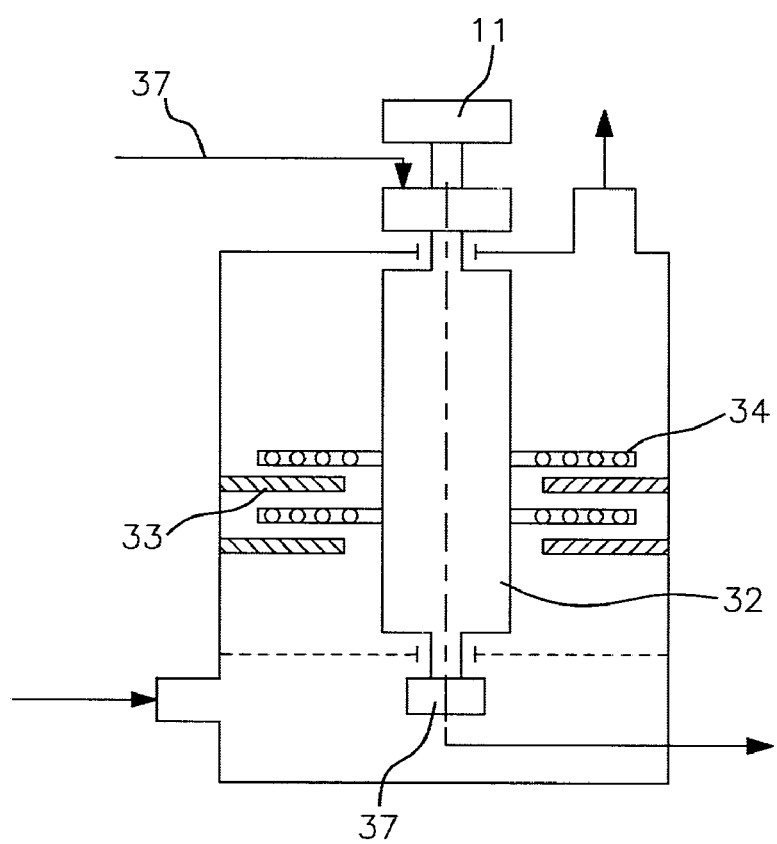
FIG. 4 shows a sectional view of an alternative embodiment according to the invention.
Figure 5:
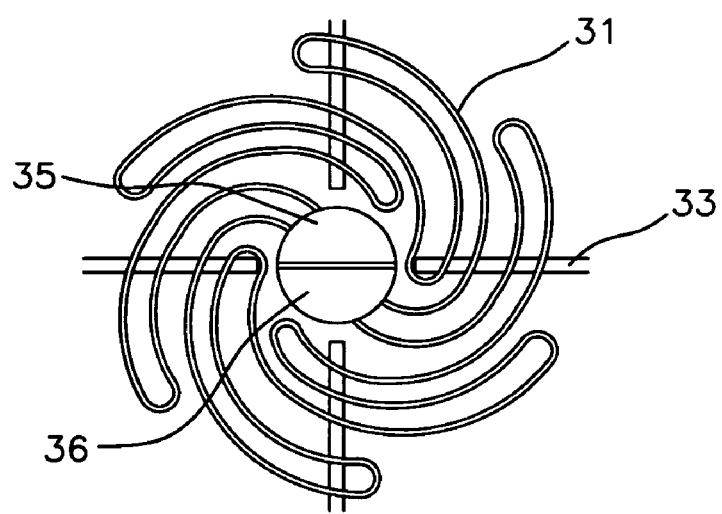
FIG. 5 contains a top view of an alternative embodiment of a heat exchanger tube according to the invention.

A second embodiment of the invention is shown in FIG. 4. Here the heat exchanger 31 rotates together with the vertical shaft 32, which also serves to supply and carry off 37 the heat-transfer gas. From the outside wall 20 of the vessel, radial arms 33 extend radially into the inside of the heat exchanger. They are mounted on several levels at different heights so that each one rests between two layers of tubes 34 and the entire heat exchanger area is covered. Similarly, several arms could be provided on each level and distributed round the circumference. Thus, relative movement is generated when the heat exchanger 31 rotates, the arms 33 act as flow breakers, thus assisting fluidisation mechanically and preventing blocking of the heat exchanger with the product. The heat-transfer gas is distributed to the individual tubes by the hollow rotating axle 32, divided into two chambers 35, 36, of the heat exchanger 31, into which the tubes open alternately (see also FIG. 5). The gas collected is led in and out respectively with the aid of rotation transmitters 37 on the axle journals.

The invention is not limited to the examples shown. In addition, both the heat exchanger tubes and the agitating arms could rotate, and it is important to ensure here that there is relative movement. In principle, the device could also be operated with other heat transfer media (saturated steam, hot water, thermal oil . . . ).

The arrangement and shape of the heat exchanger tubes can also differ from that shown, for example as conventional heating coils meandering at regular intervals.

What is claimed is:

1. A fluidized bed reaction vessel having a vertical longitudinal axis and a flow cross section, for heat transfer processing flowable bulk material introduced at an inlet of the vessel, which material flows longitudinally through the vessel over heat exchanger tubes containing a heat transfer medium and is withdrawn as a processed product from an outlet of the vessel, the improvement comprising a plurality of axially spaced apart layers of heat exchanger tubes in said flow cross section and a plurality of radially extending arms mounted between the layers of heat exchanger tubes in said flow cross section, wherein the heat exchanger tubes are rotatable about the longitudinal axis while the arms remain stationary and whereby material flowing through the vessel in the spaces between heat exchanger tubes is loosened and mixed as it passes over the arms.

2. The reaction vessel of claim 1, wherein the heat exchanger tubes extend radially across substantially the entire flow cross section.

3. The reaction vessel of claim 1, wherein the heat exchanger tubes extend radially from and rotate about a central coaxial shaft having two chambers into which the heat exchanger tubes open alternately.

4. The reaction vessel of claim 3, including rotation transmitters at the end of the central shaft, to lead a heat transfer medium into and out of the heat exchanger tubes.

5. The reaction vessel of claim 1, wherein a plurality of said reaction vessels are arranged in a cascade series.

6. The reaction vessel of claim 1, wherein the vessel is a fluidized bed reactor having upper and lower ends, wherein:
a source of said heat transfer medium delivers said medium to a first end of each tube through a source line and after said medium exchanges heat with said bulk material said medium is delivered from a second end of each tube through a return line to said source;
the tube first ends are in fixed relation to the source line and the tube second ends are in fixed relation to the return line; and
a fluidizing gas distributor in the lower end of the vessel passes fluidizing gas upwardly through the bulk material and over the tubes and arms into the upper end of the vessel.

* * * * *